US012609208B2

(12) United States Patent
Fuchita et al.

(10) Patent No.: US 12,609,208 B2
(45) Date of Patent: Apr. 21, 2026

(54) FAST NUCLEAR REACTOR CORE HAVING A GAS EXPANSION MODULE

(71) Applicant: HITACHI-GE NUCLEAR ENERGY, LTD., Ibaraki (JP)

(72) Inventors: Sho Fuchita, Ibaraki (JP); Kouji Fujimura, Tokyo (JP)

(73) Assignee: HITACHI GE VERNOVA NUCLEAR ENERGY, LTD., Ibaraki (JP)

(*) Notice: Subject to any disclaimer, the term of this patent is extended or adjusted under 35 U.S.C. 154(b) by 422 days.

(21) Appl. No.: 18/310,042

(22) Filed: May 1, 2023

(65) Prior Publication Data

US 2024/0055142 A1 Feb. 15, 2024

(30) Foreign Application Priority Data

May 25, 2022 (JP) ................................ 2022-084988

(51) Int. Cl.
*G21C 1/02* (2006.01)

(52) U.S. Cl.
CPC ............. *G21C 1/022* (2013.01); *G21C 1/028* (2013.01)

(58) Field of Classification Search
CPC ........... G21C 1/022; G21C 1/028; G21C 1/02
USPC .......................................................... 376/348
See application file for complete search history.

(56) References Cited

U.S. PATENT DOCUMENTS

| | | | | |
|---|---|---|---|---|
| 5,610,956 A * | 3/1997 | Yokoyama | G21C 1/022 376/351 |
| 2021/0287811 A1* | 9/2021 | Fujimura | G21C 1/02 |

FOREIGN PATENT DOCUMENTS

| | | |
|---|---|---|
| JP | H07-77593 A | 3/1995 |
| JP | H07-234294 A | 9/1995 |
| JP | H07-318680 A | 12/1995 |
| JP | H10-153677 A | 6/1998 |
| JP | 2017-187361 A | 10/2017 |
| JP | 2021-135248 A | 9/2021 |

OTHER PUBLICATIONS

Notice of Reasons for Refusal, mailed Mar. 4, 2025, for Japanese Application No. 2022-084988 (with English translation).
Notice of Reasons for Refusal, mailed Jun. 10, 2025, for Japanese Application No. 2022-084988 (with English translation).

* cited by examiner

*Primary Examiner* — Jack W Keith
*Assistant Examiner* — Daniel Wasil
(74) *Attorney, Agent, or Firm* — Baker Botts L.L.P.

(57) ABSTRACT

A core of a fast nuclear reactor has at least one gas expansion module, at least one neutron absorber, and at least one neutron moderator. The gas expansion module has a hollow tubular structure with one end closed and the other end opened. The at least one neutron absorber adjoins an outer face, in a radial direction of the core, of each gas expansion module. The at least one neutron moderator adjoins an outer face, in a radial direction of the core, of each gas expansion module. The at least one neutron absorber also adjoins the at least one neutron moderator.

8 Claims, 8 Drawing Sheets

FAST NUCLEAR REACTOR CORE HAVING A GAS EXPANSION MODULE

BACKGROUND

Technical Field

The present invention relates to a core of a fast reactor, equipped with at least one gas expansion module, for enhancing safety against an event of loss of metal liquid coolant of a fast reactor.

Related Art

A fast reactor that maintains a nuclear fission reaction by fast neutron is usually composed of a core housed in a reactor vessel, and a coolant (liquid metal coolant) filled in the reactor vessel. The core of the fast reactor is loaded with a plurality of fuel assemblies. Each fuel assembly includes a plurality of bundled fuel rods, and a wrapper tube that houses the fuel rods. Each fuel rod is constituted by a nuclear fuel material, and a cladding that encloses the nuclear fuel material.

Form of the nuclear fuel material enclosed in the fuel rod of the fuel assembly is exemplified by oxide fuel, metal fuel, and nitride fuel. The nuclear fuel material typically includes depleted uranium (U-238) enriched with plutonium (Pu), and enriched uranium fuel whose isotope ratio of fissile uranium (U-235) has been elevated from that in the natural uranium.

The core of the fast reactor has a core fuel region that contains a fuel assembly, a blanket fuel region that surrounds the core fuel region, and a shield region that surrounds the blanket fuel region. The blanket fuel region is omissible in some cases. The shield region has a reflector made of stainless steel, aiming at enhancing the neutron economy of the core.

The fast reactor uses a control rod to control startup or shut down of the fast reactor, or to adjust the reactor power. The control rod includes a plurality of neutron absorption rods each having boron carbide ($B_4C$) pellets packed in a stainless steel cladding, and the neutron absorption rods are housed in an annular control rod guide tube.

Considering now an almost impossible event (ULOF: Unprotected Loss of Flow) in which a reactor shutdown failure using the control rod is overlaid by a loss of flow of a primary system coolant, typically due to failure of a main circulation pump that circulates the coolant in the reactor vessel, the core fuel assembly would unbalance the output-flow ratio (P/F), leading to temperature rise of the coolant near the core. A fast reactor, with use of a liquid metal as the coolant, usually increases the output when the coolant is heated up or boiled, since positive reactivity is inserted.

In order to avoid the aforementioned increase in the core output just in case of ULOF, Patent Literature 1 has proposed a technology below.

According to Patent Literature 1, gas expansion modules are arranged so as to adjoin the outer face of the outermost peripheral fuel assemblies in the core fuel region.

During the rated operation, the sodium liquid level in the gas expansion module is kept above the top end of the core fuel region, whereby any possible leakage in the radial direction of neutron generated in the core fuel may be suppressed by scattering effect of sodium.

On the other hand, in case of pressure drop of the coolant at a sodium inlet at the bottom end of the gas expansion module, typically due to failure of the main circulation pump, the sodium liquid level in the gas expansion module is lowered below the bottom end of the core fuel region, thus increasing the leakage of neutron in the radial direction. This suppresses the positive reactivity in case of ULOF, and thus suppresses the core from increasing the output.

CITATION LIST

Patent Literature

Patent Literature 1: JP 2017-187361 A

SUMMARY

The structure described in Patent Literature 1 has reflectors arranged behind the gas expansion modules, when viewed in a horizontally outward direction from the core center.

Hence, if the sodium liquid level in the gas expansion module were lowered typically due to a failure of the main circulation pump, neutron having leaked from the core in the radial direction would be scattered by the reflectors, and a part thereof re-enters the core fuel region. This, however, makes the core output unlikely to be lowered, thus reducing the neutron leakage effect of the gas expansion module.

It is therefore an object of the present invention, aimed at solving such technical problem, to provide a core of a fast reactor equipped with gas expansion modules, thus designed to be able to enhance a positive reactivity-suppressive effect, even in an assumed case of ULOF.

The above and other objects of the present invention and the novel features of the present invention will be clarified by the description of the present specification and the accompanying drawings.

A core of a fast reactor of the present invention is the core having at least one gas expansion module arranged therein, each module having a hollow tubular structure with one end closed and the other end opened.

The core of the fast reactor of the present invention is structured to have at least one neutron absorber that absorbs neutron, or, at least one neutron moderator that slows down neutron, arranged so as to adjoin the outer face, in the radial direction of the core, of the gas expansion module.

According to the aforementioned core of the fast reactor of the present invention, the neutron absorber or the neutron moderator, arranged so as to adjoin the outer face of the gas expansion module, can suppress neutron, having leaked during operation of the gas expansion module, from being scattered back to the core fuel region. This successfully provides the core of the fast reactor, capable of enhancing a positive reactivity-suppressive effect of the gas expansion module in case of ULOF.

Problems, structures, and effects other than those described above will be clarified by the following description of the embodiments.

DETAILED DESCRIPTION

Figure 1:
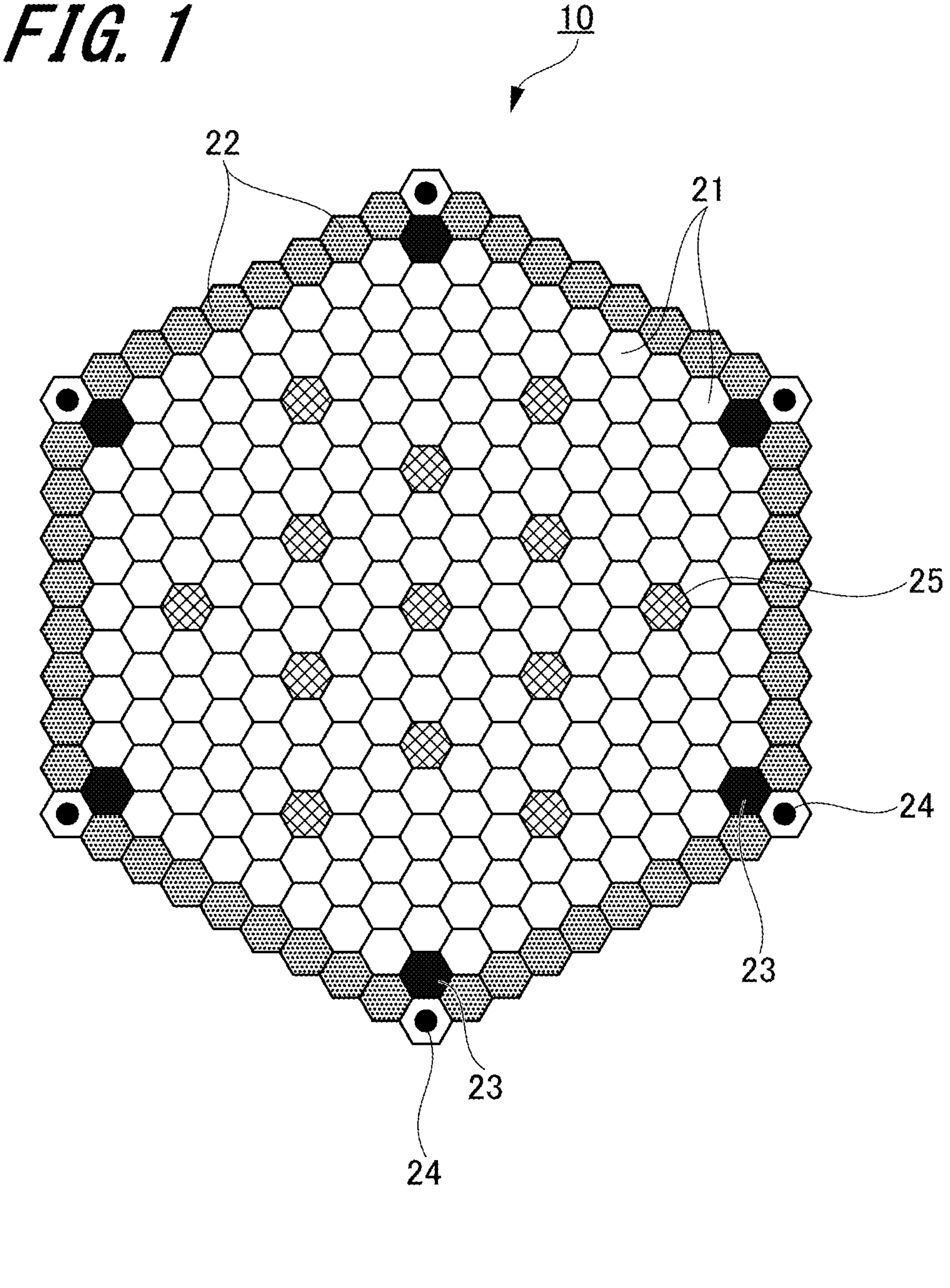
FIG. 1 is a lateral cross-sectional view illustrating a core of a fast reactor of Example 1.

A detailed description will hereinafter be given of embodiments and examples of the present invention with consultation of texts or drawings. Note, however, that the structures, materials, and other specific various arrangements and so forth illustrated in the present invention are not limited to the embodiments and examples described herein, and may be appropriately combined and improved without changing the gist. Any elements not directly related to the present invention will not be illustrated.

A core of a fast reactor of the present invention is the core having at least one gas expansion module arranged therein, each module having a hollow tubular structure with one end closed and the other end opened.

The core of the fast reactor of the present invention is structured to have at least one neutron absorber that absorbs neutron, or, at least one neutron moderator that slows down neutron, arranged so as to adjoin the outer face, in the radial direction of the core, of the gas expansion module.

According to the structure of the core of the fast reactor of the present invention, the neutron absorber or the neutron moderator arranged so as to adjoin the outer face of the gas expansion module can suppress neutron, having leaked during operation of the gas expansion module, from being scattered back to the core fuel region. This successfully provides the core of the fast reactor, capable of enhancing a positive reactivity-suppressive effect of the gas expansion module in case of ULOF.

In addition, the core of the fast reactor of the present invention can reduce the number of units of gas expansion module, as compared with a conventional core having the same reactivity required for the gas expansion module, but having neither neutron absorber nor neutron moderator provided thereto.

The core of the fast reactor structured as described above may typically use boron carbide ($B_4C$) as the neutron absorber that absorbs neutron. The neutron absorber may be structured by housing at least a neutron absorbing rod having boron carbide pellets packed therein, in a wrapper tube.

In the structure of the core of the fast reactor, materials for composing the neutron moderator that slows down neutron is exemplified by zirconium hydride, yttrium hydride, hafnium hydride, calcium hydride, some kind of hydride, silicon carbide, and beryllium.

The aforementioned core of a fast reactor may be structured to have a single series of the gas expansion modules arranged along the outer face in the radial direction of the core fuel region.

Also in the thus structured core having a single series of the gas expansion modules arranged along the outer face in the radial direction of the core fuel region, the neutron absorber or the neutron moderator can suppress neutron, having leaked during operation of the gas expansion module, from being scattered back to the core fuel region.

The aforementioned core of a fast reactor may be structured so that each neutron moderator is arranged so as to adjoin the outer face, in the radial direction of the core, of each gas expansion module; and so that each neutron absorber is arranged so as to adjoin each gas expansion module and each neutron moderator.

With such structure in which the neutron absorber and the neutron moderator are arranged so as to adjoin the gas expansion module, obtainable is a further enhanced effect of suppressing neutron, having leaked during operation of the gas expansion module, from being scattered back to the core fuel region.

The aforementioned core of a fast reactor may be further structured to have a radial-direction blanket region arranged between the core fuel region and a shield region, in which each gas expansion module is arranged between the core fuel region and the radial-direction blanket region, and each neutron absorber is arranged so as to adjoin the outer face, in the radial direction, of the gas expansion module.

Also in the thus structured core having the radial-direction blanket region arranged between the core fuel region and the shield region, the neutron absorber can suppress neutron, having leaked during operation of the gas expansion module, from being scattered back to the core fuel region.

The aforementioned core of a fast reactor may be structured to have a sodium plenum arranged over the core fuel region.

Also in the thus structured core having the sodium plenum arranged over the core fuel region, the neutron absorber or the neutron moderator can suppress neutron, having leaked during operation of the gas expansion module, from being scattered back to the core fuel region.

In this structure, the core fuel region may have an inner core fuel region and an outer core fuel region, with the level of height of the top end of the outer core fuel region set higher than the level of height of the top end of the inner core fuel region.

With the level of height of the top end of the outer core fuel region set higher than the level of height of the top end of the inner core fuel region, now the height of the entire outer core fuel region is elevated, thereby enhancing the output of the outer core fuel region. This makes it possible to reduce difference between the output of the outer core fuel region and the output of the inner core fuel region, or to equalize the outputs of the outer core fuel region and the output of the inner core fuel region.

In the thus structured core of the fast reactor, the top end of the neutron absorber may be arranged at the level higher than a liquid level in the gas expansion module at the startup of a main circulation pump, and the bottom end of the neutron absorber may be kept at a level lower than the liquid level in the gas expansion module during shutdown of the main circulation pump.

With such structure, the neutron absorber may be opposed to the gas space in the gas expansion module, either at the startup or during shutdown of the main circulation pump, whereby neutron having passed through the gas space may be absorbed by the neutron absorber.

In this configuration, the top end of the neutron absorber is kept at a level higher than the top end of the gas space in the gas expansion module. Being kept at a level higher than the top end of the gas space in the gas expansion module, the neutron absorber can cover the entire gas space, and can reliably absorb neutron having passed through the gas space.

In the thus structured core of the fast reactor, at least one gas expansion module has, arranged above the gas space thereof, the at least one neutron absorber that absorbs neutron.

With such structure in which the neutron absorber and the neutron moderator are arranged also above the gas space of the gas expansion module, obtainable is a further enhanced effect of suppressing neutron, having leaked during operation of the gas expansion module, from being scattered back into the core fuel region.

Examples

Specific Examples of the core of the fast reactor will be explained below.

(Structure of Fast Reactor Generation System)

Before explaining the Examples of the core, an exemplary fast reactor generation system to which Examples of the core are applied, will be described.

Figure 3:
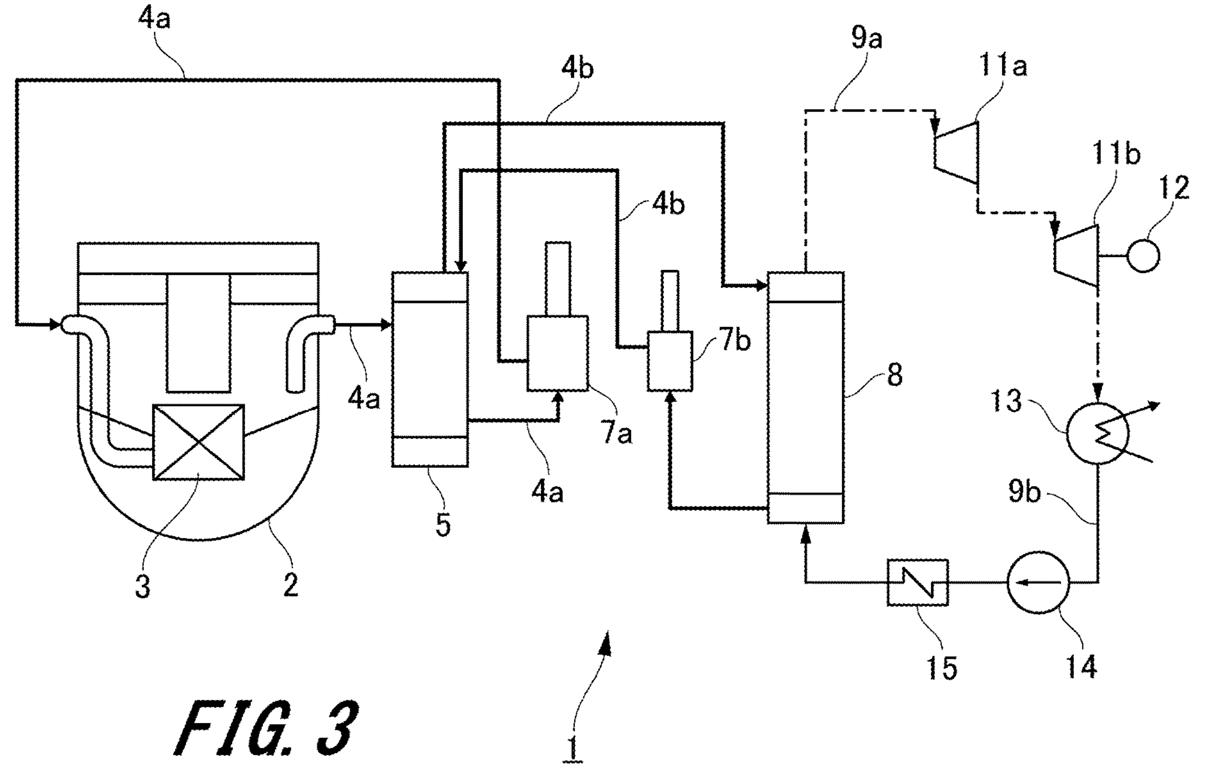
FIG. 3 is an overall structure diagram illustrating an exemplary fast reactor generation system to which an example of the core is applied.

An overall structure diagram illustrating an exemplary fast reactor generation system to which Examples of the core are applied, is given in FIG. 3.

A fast reactor generation system 1 illustrated in FIG. 3 includes a reactor vessel 2, a core 3, an intermediate heat exchanger 5, a primary main circulation pump 7*a*, a secondary main circulation pump 7*b*, and a steam generator 8.

The fast reactor generation system 1 also includes a main steam system pipe 9*a*, a high pressure turbine 11*a*, a low pressure turbine 11*b*, a generator 12, a condenser 13, a feedwater/condensate system pipe 9*b*, a feedwater pump 14, and a feedwater heater 15.

The core 3 contains a fissile material, and is housed in the reactor vessel 2.

The intermediate heat exchanger 5 and the primary main circulation pump 7*a* are connected in sequence on a path from the reactor vessel 2, via a primary cooling system pipe 4*a*.

The secondary main circulation pump 7*b* and the steam generator 8 are connected in sequence on a path from the intermediate heat exchanger 5, via a secondary cooling system pipe 4*b*.

The main steam system pipe 9*a* sends steam generated in the steam generator 8, to the high pressure turbine 11*a* and to the low pressure turbine 11*b*.

The high pressure turbine 11*a* and the low pressure turbine 11*b* are driven by the thus sent steam.

The generator 12 is connected to a shaft of the low pressure turbine 11*b*. The generator 12 is also connected to a shaft of the high pressure turbine 11*a*, although not illustrated.

The condenser 13 condenses the steam after passed through the high pressure turbine 11*a* and the low pressure turbine 11*b*, to return it to water.

The feedwater/condensate system pipe 9*b* returns the water condensed in the condenser 13 to the steam generator 8.

The feedwater pump 14 and the feedwater heater 15 are connected to the feedwater/condensate system pipe 9*b*, on the downstream side of the condenser 13.

The fast reactor generation system 1 operates to pass a primary system coolant (liquid sodium, for example), having been heated in the core 3, through the intermediate heat exchanger 5, thereby heating a secondary system coolant (liquid sodium, for example).

The fast reactor generation system 1 also operates to pass the secondary coolant through the steam generator 8 to generate steam in the main steam system pipe 9*a*, and to guide the steam to the high pressure turbine 11*a* and the low pressure turbine 11*b*, thereby making the generator 12 generate power.

The steam used for power generation is condensed to water in the condenser 13, in the same manner as in a power generation system with a boiling water reactor (BWR) or a pressurized water reactor (PWR), and then passed through the feedwater pump 14 and the feedwater heater 15 to be heated and pressurized, and then fed to the steam generator 8.

The core 3 is loaded with a plurality of core fuel assemblies, control rods, and gas expansion modules (GEM), which will be described later.

The reactor vessel 2 that houses the core 3 is filled with a primary system coolant. The primary system coolant enters the core 3 from the bottom of the core 3, rises up along a core fuel assembly, and flows through the primary cooling system pipe 4*a* into the intermediate heat exchanger 5 provided outside the reactor vessel 2, with the aid of the primary main circulation pump 7*a*. This constitutes a loop-type fast reactor.

Note, although the present specification will deal with the loop-type fast reactor, the present invention is by no means limited thereto, or rather also applicable to a tank-type fast reactor in which the reactor vessel 2, the primary main circulation pump 7*a*, and the intermediate heat exchanger 5 are collectively housed in a tank.

EXAMPLES

Examples of the core of the fast reactor will be explained below.

Example 1

FIG. 1 is a lateral cross-sectional view illustrating a core of a fast reactor of Example 1.

As illustrated in FIG. 1, a core 10 of the fast reactor of this example is intended to be housed in the reactor vessel 2 of the fast reactor illustrated in FIG. 3, and has a core fuel region 21, and a reflector region 22 that surrounds overall the core fuel region 21, which are arranged in radial direction.

The core 10 also has gas expansion modules (GEM) 23 each arranged so as to adjoin the core fuel region 21 and the reflector region 22. More specifically, the gas expansion modules 23, totaling six units, are arranged one by one near each of six apexes of the hexagonal core 10.

The core fuel region 21 has, arranged therein, control rods 25 used at the startup, during the shutdown, or for adjustment of the output of the reactor. Each control rod 25 has a plurality of neutron absorption rods each having boron carbide ($B_4C$) pellets packed in a stainless steel cladding, and the neutron absorption rods are housed in an annular shroud tube. Although the control rod 25 is actually constituted by two independent systems that include a main reactor shutdown system and a backup reactor shutdown system, FIG. 1 illustrates these systems in common.

Note that the lateral cross-sectional view of the core 10 of the fast reactor in FIG. 1 illustrates a positional relation between the plurality of fuel assemblies loaded in the core fuel region 21 of the core 10, and the plurality of gas expansion modules 23, in a simplified manner for the convenience of explanation, without specially limiting the number of units of fuel assembly and the number of units of gas expansion module 23 loaded in the core fuel region 21 of the core 10.

The gas expansion module (GEM) 23 is a hollow tubular structure with one end closed and with the other end opened, and has an appearance similar to that of a wrapper tube of the fuel assembly loaded to the core fuel region 21.

The core 10 of the fast reactor of this example has neutron absorbers 24 that function to absorb neutron, each of which is arranged so as to adjoin the outer face, in the radial direction outwards from the center of the core, of each gas expansion module 23.

Each neutron absorber 24 has a plurality of neutron absorbing rods each having boron carbide ($B_4C$) pellets packed in a stainless steel cladding, and the neutron absorption rods are housed in a wrapper tube similar to that of the fuel assembly loaded to the core fuel region 21.

Figure 2:
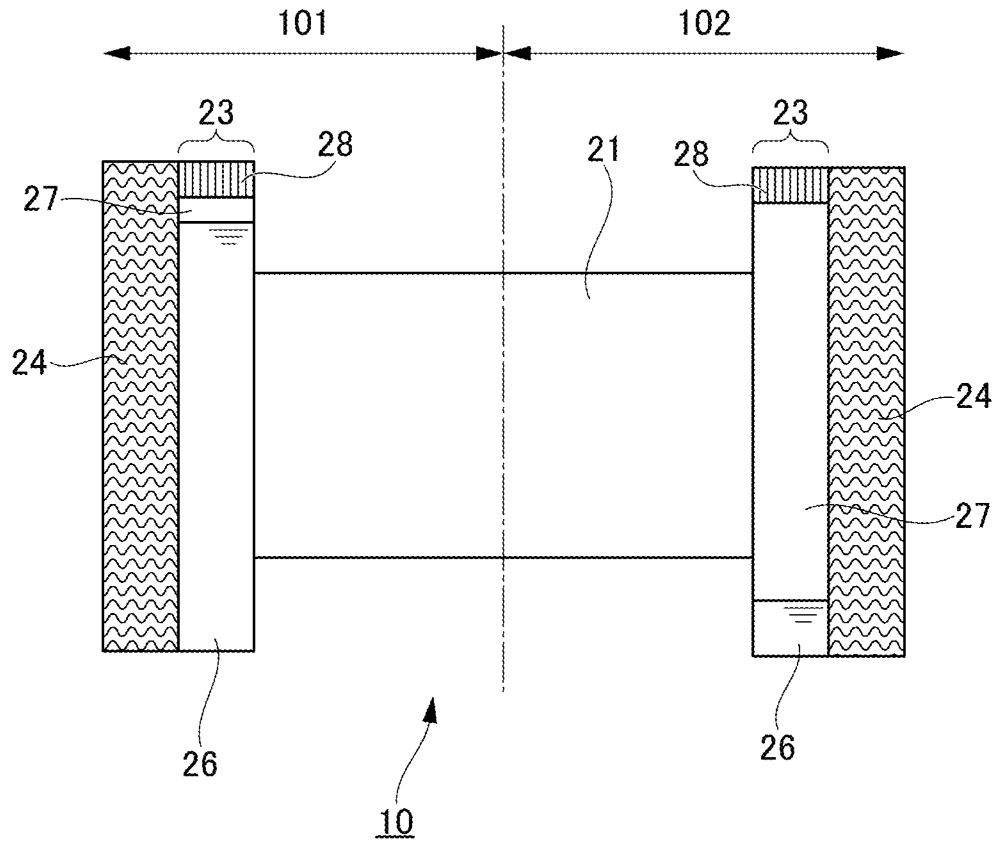
FIG. 2 is a vertical cross-sectional view illustrating the core of the fast reactor illustrated in FIG. 1, inclusive of gas expansion modules and neutron absorbers.

FIG. 2 is a vertical cross-sectional view illustrating the core 10 of the fast reactor illustrated in FIG. 1, inclusive of the gas expansion modules 23 and the neutron absorbers 24.

A left half 101 of FIG. 2 illustrates a state during operation under a rated flow rate of the primary main circulation pump 7*a* having been illustrated in FIG. 3.

Meanwhile, a right half 102 of FIG. 2 illustrates a state of accident (the aforementioned ULOF) caused by loss of flow of the coolant upon shutdown of the primary main circulation pump 7*a* typically due to loss of power, overlaid with scram failure.

As illustrated in FIG. 2, the gas expansion module 23 is a hollow tubular structure with one end closed and the other end opened, which is vertically arranged so as to be closed at the top end, and opened at the bottom end. The tubular structure has enclosed therein a sodium (Na) coolant 26, and an inert argon (Ar) gas 27.

The sodium (Na) coolant 26 is a liquid, and is allowed to freely enter or exit the tubular structure through the opened bottom end of the gas expansion module 23.

The inert argon (Ar) gas 27 is housed in a space between the top face of the sodium (Na) coolant 26, and the closed top end of the tubular structure of the gas expansion module 23.

Also as illustrated in FIG. 2, a neutron shield 28 made of stainless steel is arranged at the topmost part of each gas expansion module 23, that is, on the top end of the tubular structure of each gas expansion module 23.

The neutron shield 28, by its nature, shields neutron and reduce leakage thereof to the outside.

As illustrated in the left half 101 of FIG. 2, during operation under a rated flow rate of the primary main circulation pump 7*a*, pressure of the sodium (Na) coolant 26 increases at the inlet (bottom end) of the gas expansion module 23. Hence, the liquid level of the sodium coolant 26 in the gas expansion module 23 is kept higher than the top end of the core fuel in the core fuel assemblies loaded to the core fuel region 21. The sodium coolant 26 in the gas expansion module 23 at this time serves as a reflector with its neutron scattering effect, so that the leakage of neutron from the core 10 is suppressed low.

In contrast in ULOF, the output-flow ratio (P/F) of the fuel assembly will become unbalanced, which can elevate the temperature of the sodium coolant 26 and can lower the density of the sodium coolant 26, leading to pressure drop of the sodium coolant 26 at the inlet of the gas expansion module 23. Hence, the liquid level of the sodium coolant 26 in the gas expansion module 23 will go down to a level lower than the bottom end of the core fuel in the core fuel assemblies loaded to the core fuel region 21, as illustrated in the right half 102 of FIG. 2. The gas expansion module 23 at this time will have filled therein an expanded volume of the inert argon (Ar) gas 27, and will have reduced neutron scattering effect, due to small density of the inert argon gas 27. Hence, the leakage of neutron from the core 10 will become larger.

Judged from the above, the gas expansion module 23 in case of ULOF can apply negative reactivity to the core 10.

Therefore, even in case of ULOF, in which the flow rate of the sodium coolant 26 in the core fuel assembly in the core fuel region 21 goes down to apply positive reactivity to the core 10, the core 10 may be successfully suppressed from increasing the output, with the aid of the negative reactivity applied by the gas expansion module 23. That is, safety of the core 10 in case of ULOF improves.

Moreover, the core 10 of this example has the neutron absorbers 24 that absorb neutron, each arranged so as to adjoin the outer face, in the radial direction, of each gas expansion module 23, thus increasing the amount of capture of neutron that possibly leaks from the core fuel region 21 in case of ULOF through the gas expansion modules 23. Hence, the scattering of neutron back into the core fuel region 21, in case of lowering of the liquid level of sodium coolant 26 in the gas expansion module 23, will be suppressed and the net leakage of neutron will increase, as compared with a prior core having the gas expansion module 23, but not having the neutron absorber arranged so as to adjoin the outer face thereof.

As illustrated in FIG. 2, the top end of the neutron absorber 24 is kept at a level higher than the liquid level in the gas expansion module 23 at the startup 101 of the main circulation pump, meanwhile the bottom end of the neutron absorber 24 is kept at a level lower than the liquid level in the gas expansion module 23 during shutdown 102 of the main circulation pump.

With such structure, the neutron absorber 24 may be opposed to the gas space of the inert argon gas 27, either at the startup 101 or during shutdown 102 of the main circulation pump, whereby neutron having passed through the gas space may be absorbed by the neutron absorber 24.

In addition, as illustrated in FIG. 2, the top end of the neutron absorber 24 is kept at a level higher than the top end of the gas space of the inert argon gas 27 in the gas expansion module 23.

This enables the neutron absorber 24 to cover the entire gas space, and to reliably absorb neutron having passed through the gas space.

As described above, with the neutron absorbers 24 arranged so as to adjoin the outer face, in the radial direction, of the gas expansion modules 23, this example can provide a fast reactor capable of increasing the absolute value of the negative reactivity applied by the gas expansion module 23, even in an assumed case of ULOF.

Note that, although FIG. 1 has illustrated a case where one unit of neutron absorber 24 is arranged so as to adjoin the outer face, in the radial direction, of each gas expansion module 23, it is alternatively acceptable to replace two units of neutron reflector 22 that adjoin each gas expansion module 23, with the neutron absorbers 24. This further increases the absolute value of the negative reactivity applied by the gas expansion module 23. This also increases the net leakage of neutron, in case of boiling or decrease of density of the coolant in the core part.

Also use of the neutron moderator that slows down neutron, in place of the neutron absorber 24, can further increase the absolute value of the negative reactivity applied by the gas expansion module 23.

Materials for composing the neutron moderator that slows down neutron applicable herein include zirconium hydride, yttrium hydride, hafnium hydride, calcium hydride, some kind of hydride, silicon carbide, and beryllium.

Example 2

Next, a core of the fast reactor of Example 2 will be explained.

Figure 4:
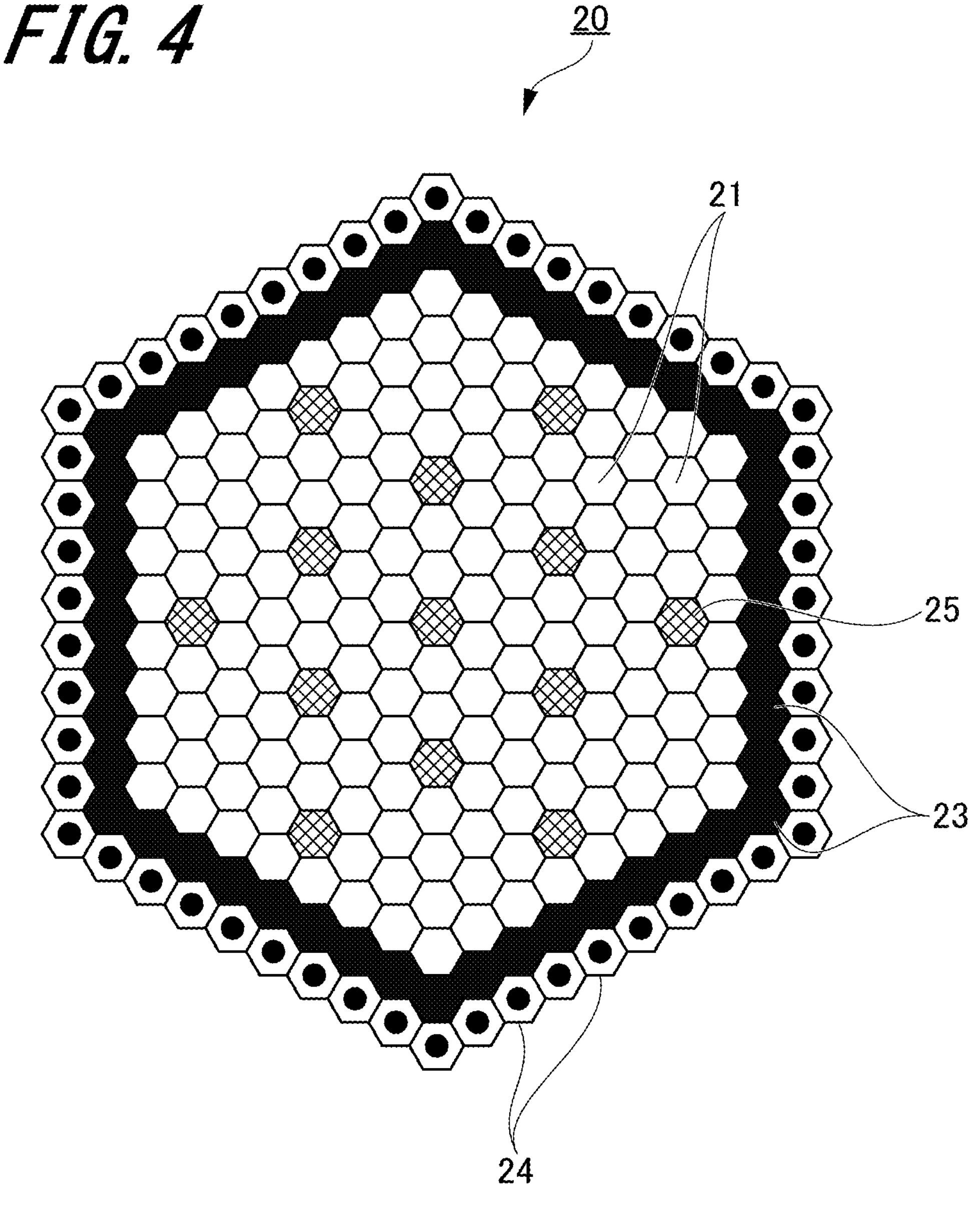
FIG. 4 is a lateral cross-sectional view illustrating a core of a fast reactor of Example 2.

FIG. 4 is a lateral cross-sectional view illustrating a core 20 of the fast reactor of Example 2.

In the aforementioned core 10 of the fast reactor of Example 1, the gas expansion modules 23 were discretely loaded outside the core fuel region 21, and the neutron absorbers 24 were arranged outside, in the radial direction, of the gas expansion modules 23.

On the other hand, the core 20 of this example is different from the core 10 of Example 1, in that the gas expansion modules 23 are loaded in the circumferential direction so as to surround the core fuel region 21, and the neutron absorbers 24 are arranged again in the circumferential direction so as to surround the gas expansion modules 23.

In FIG. 4, the constituents similar to those of the core 10 in Example 1 are given the same reference signs.

The core 20 of this example is intended to be housed in the reactor vessel 2 of the fast reactor illustrated in FIG. 3. As illustrated in FIG. 4, the core 20 of this example has the core fuel region 21, the gas expansion modules (GEM) 23 that surround overall the core fuel region 21, and the neutron absorbers 24 that surround overall the gas expansion modules (GEM) 23, which are arranged in the radial direction.

The core 20 of this example has the maximum possible number of units of the gas expansion modules 23, arranged so as to surround overall the core fuel region 21. This maximizes the amount of neutron leaked during ULOF through the gas expansion modules 23, and enables the neutron absorbers 24, arranged without a break, to absorb the leaked neutron, thus further enhancing the effect similar to that in Example 1. This also increases the net leakage of neutron, in case of boiling or decrease of density of the coolant in the core part.

From the viewpoint of neutron shielding, the core 20 may also have arranged therein neutron shields made of stainless steel or boron carbide ($B_4C$), although not illustrated, so as to adjoin the outer face in the radial direction of the neutron absorbers 24.

Alternatively, neutron moderators may be arranged in place of the neutron absorbers 24 illustrated in FIG. 4. This further increases the absolute value of the negative reactivity applied by the gas expansion modules 23.

Example 3

Next, a core of the fast reactor of Example 3 will be explained.

Figure 5:
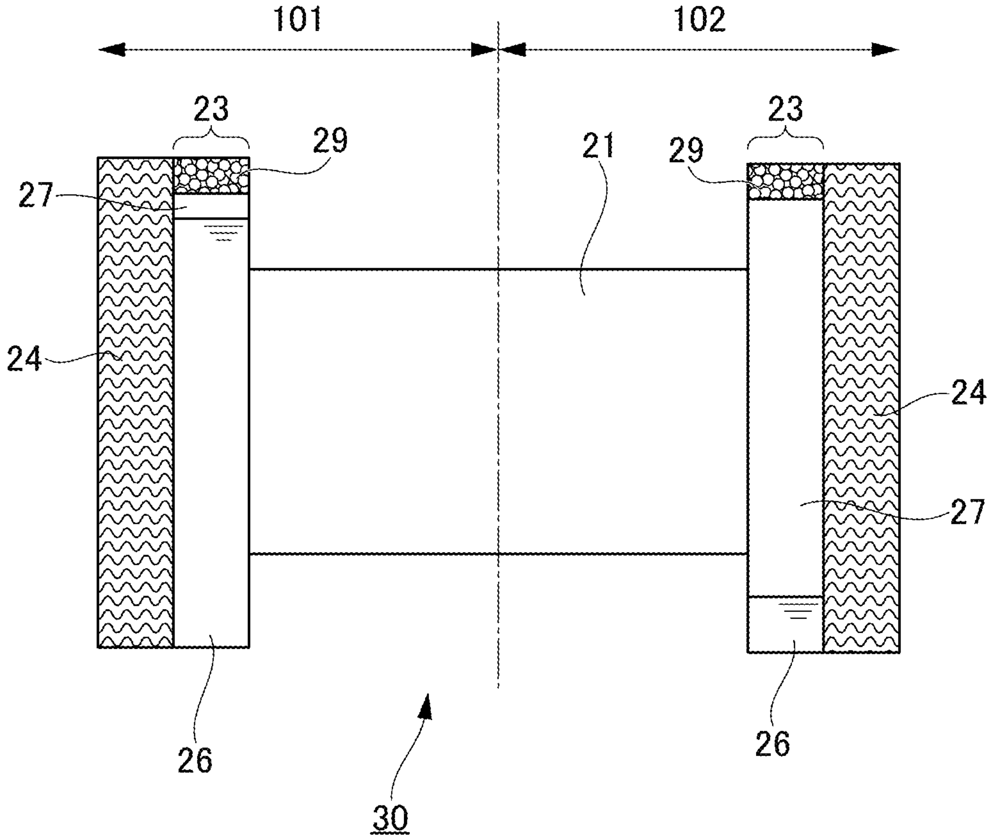
FIG. 5 is a vertical cross-sectional view illustrating a core of a fast reactor of Example 3.

FIG. 5 is a vertical cross-sectional view illustrating a core 30 (inclusive of the gas expansion modules and neutron absorbers) of the fast reactor or Example 3.

In the aforementioned core 10 of Example 1, the neutron shield 28 made of stainless steel was arranged at the topmost part of each gas expansion module 23, that is, above the gas space.

On the other hand, the core 30 of this example is different from the core 10 of Example 1, in that having a neutron absorber 29 that absorbs neutron, arranged at the topmost part of the gas space of each gas expansion module 23.

In FIG. 5, the constituents similar to those of the core 10 in Example 1 are given the same reference signs.

Materials applicable to the neutron absorber 29 illustrated in FIG. 5 may be similar to those composing the neutron absorbers 24 arranged on the outside, in the radial direction, of the gas expansion modules 23, or other material having a property of absorbing neutron.

In this example, the neutron absorber 29 is arranged on the gas space of each gas expansion module 23. Hence, the neutron absorber 29 absorbs scattered neutron, and thus can reduce neutron possibly scattered back to the core fuel region 21, making it possible to further enhance an effect similar to that of the core 10 in Example 1.

Note that neutron moderators may be arranged in place of the neutron absorbers 29 in FIG. 5, thereby further increasing the absolute value of the negative reactivity applied by the gas expansion modules 23.

Example 4

Next, a core of the fast reactor of Example 4 will be explained.

Figure 6:
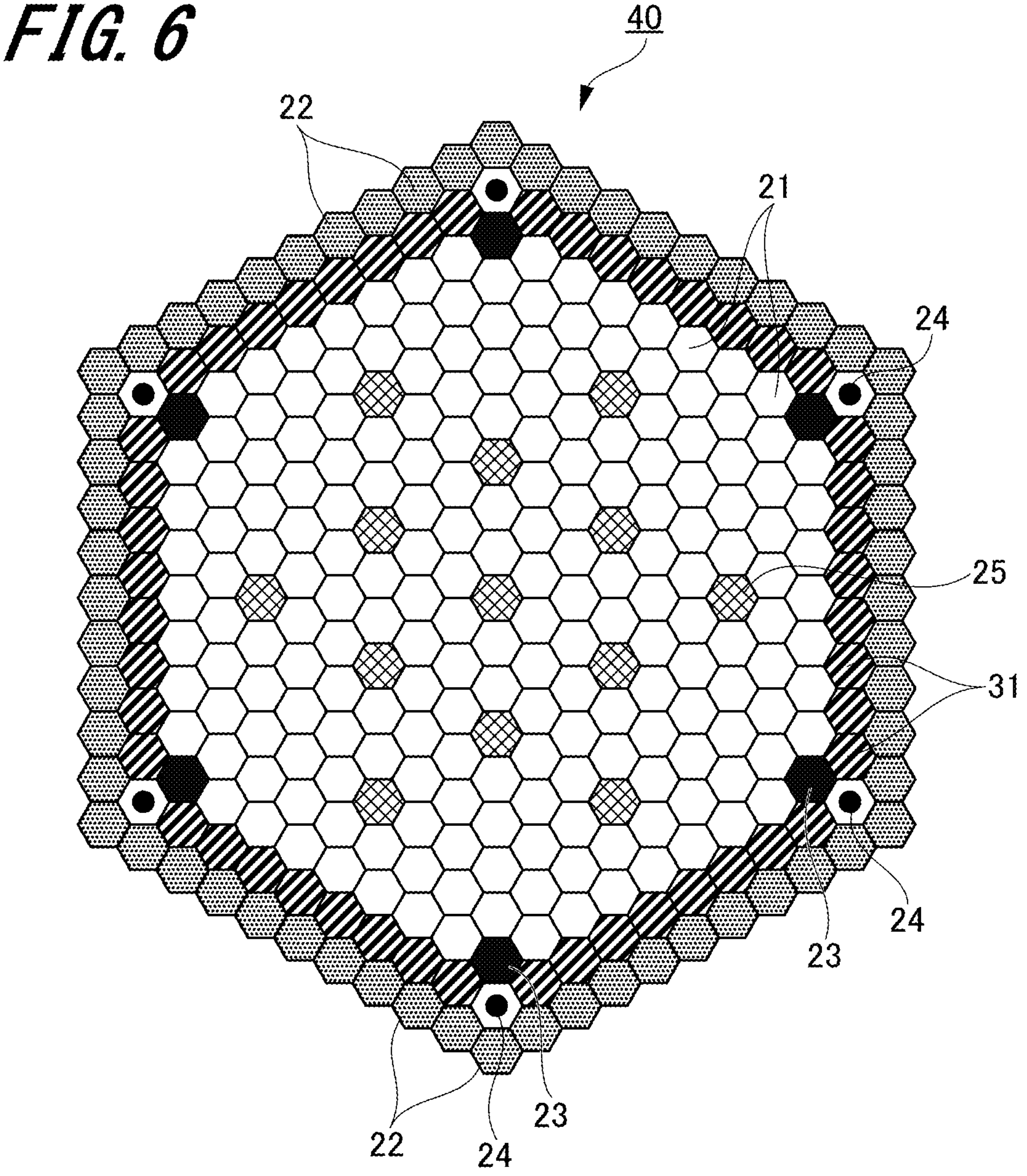
FIG. 6 is a lateral cross-sectional view illustrating a core of a fast reactor of Example 4.

FIG. 6 is a lateral cross-sectional view illustrating a core 40 of the fast reactor of Example 4.

In the aforementioned core 10 of Example 1, the reflector region 22 was arranged so as to adjoin the outer face of the core fuel region 21.

In contrast, the core 40 of this example has blanket region 31 that is arranged between the core fuel region 21 and the reflector region 22, wherein the reflector region 22 is arranged so as to adjoin the outer faces of the neutron absorbers 24, and the blanket region 31 is arranged beside the neutron absorbers 24.

In FIG. 6, the constituents similar to those of the core 10 in Example 1 are given the same reference signs.

As illustrated in FIG. 6, the core 40 of this example has the blanket region 31 arranged between the core fuel region 21 and the reflector region 22.

The blanket region 31 may have a structure having, loaded therein, blanket fuel assemblies each having a plurality of fuel rods filled with a plurality of uranium dioxide pellets made of depleted uranium, as has been described in paragraph [0005] of Patent Literature 1.

The core 40 of this example has the blanket region 31 arranged between the core fuel region 21 and the reflector region 22. This makes it possible to use depleted uranium, for example, as a fuel in the blanket region 31.

As can be understood from the structure of the core 40 of this example, an effect similar to that of the core 10 of Example 1 is obtainable also from the core 40 having the blanket region 31 arranged on the outer side of the core fuel region 21, by arranging the neutron absorbers 24 so as to adjoin the outer faces, in the radial direction, of the gas expansion modules 23.

Alternatively, neutron moderators may be arranged in place of the neutron absorbers 24 illustrated in FIG. 6. This further increases the absolute value of the negative reactivity applied by the gas expansion modules 23.

Example 5

Next, a core of the fast reactor of Example 5 will be explained.

Figure 7:
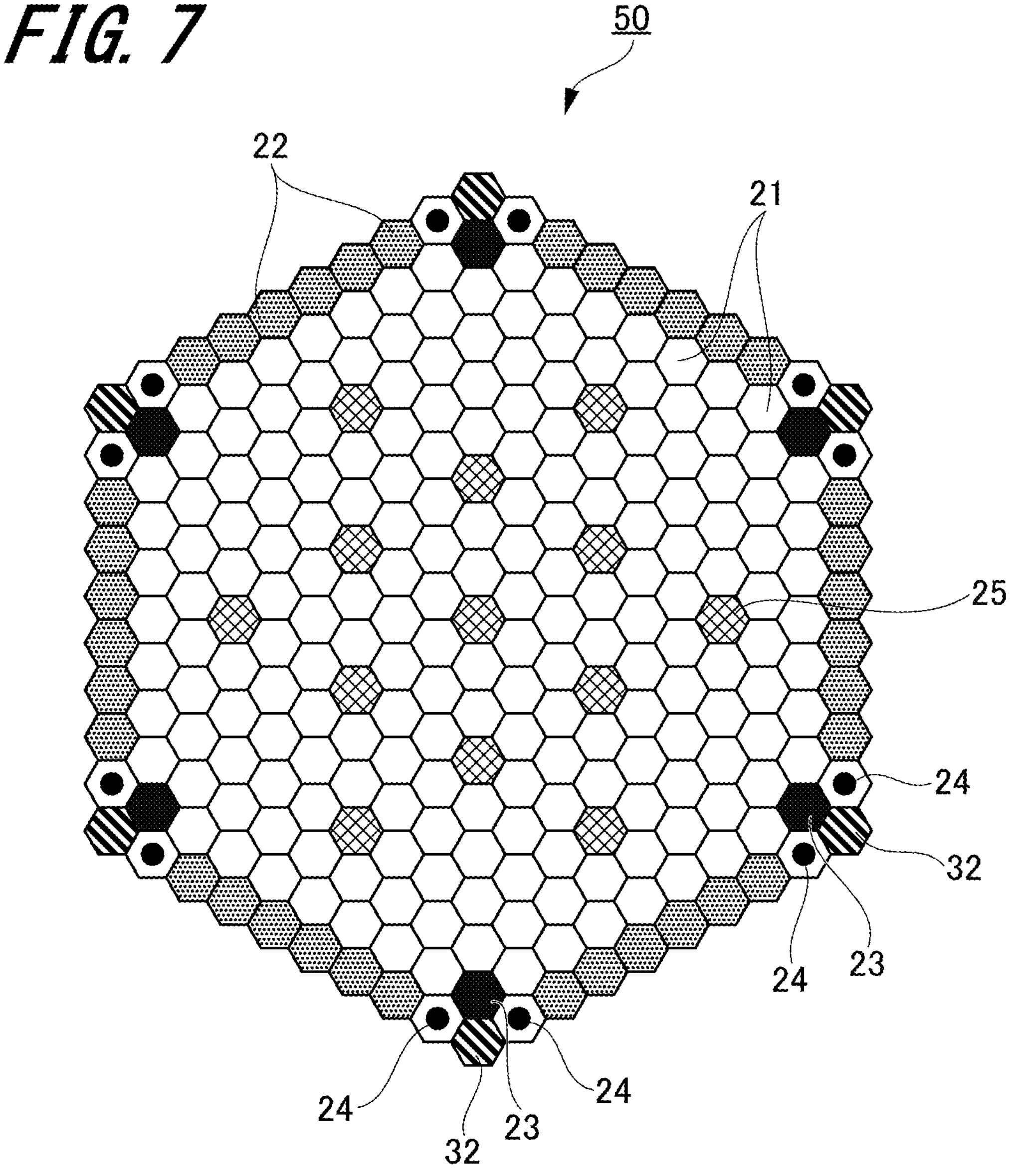
FIG. 7 is a lateral cross-sectional view illustrating a core of a fast reactor of Example 5.

FIG. 7 is a lateral cross-sectional view illustrating a core 50 of the fast reactor of Example 5.

In the aforementioned core 10 of Example 1, one unit of neutron absorber 24 was arranged so as to adjoin the outer face, in the radial direction, of each gas expansion module 23.

In contrast, the core 50 of this example has two units of neutron absorber 24 and one unit of neutron moderator 32 arranged on the outer side of each gas expansion module 23.

In FIG. 7, the constituents similar to those of the core 10 in Example 1 are given the same reference signs.

As illustrated in FIG. 7, the core 50 of this example has one unit of neutron moderator 32 arranged so as to adjoin the outer face, in the radial direction, of each gas expansion module 23, and has the neutron absorbers 24 each arranged on the outer side of each gas expansion module 23, so as to adjoin the gas expansion module 23 and the neutron moderator 32. That is, the core 50 of this example employs the neutron absorbers 24 and the neutron moderators 32 in a combined manner.

Materials for composing the neutron moderator 32 applicable herein include zirconium hydride, yttrium hydride, hafnium hydride, calcium hydride, some kind of hydride, silicon carbide, and beryllium.

The core 50 of this example has the neutron absorbers 24 and the neutron moderators 32 arranged on the outer side of the core fuel region 21, thus employing the neutron absorbers 24 and the neutron moderators 32 in a combined manner. This further increase the absolute value of the negative reactivity applied by the gas expansion modules 23, as compared with the case with the neutron absorbers 24 alone.

Example 6

Next, a core of the fast reactor of Example 6 will be explained.

Figure 8:
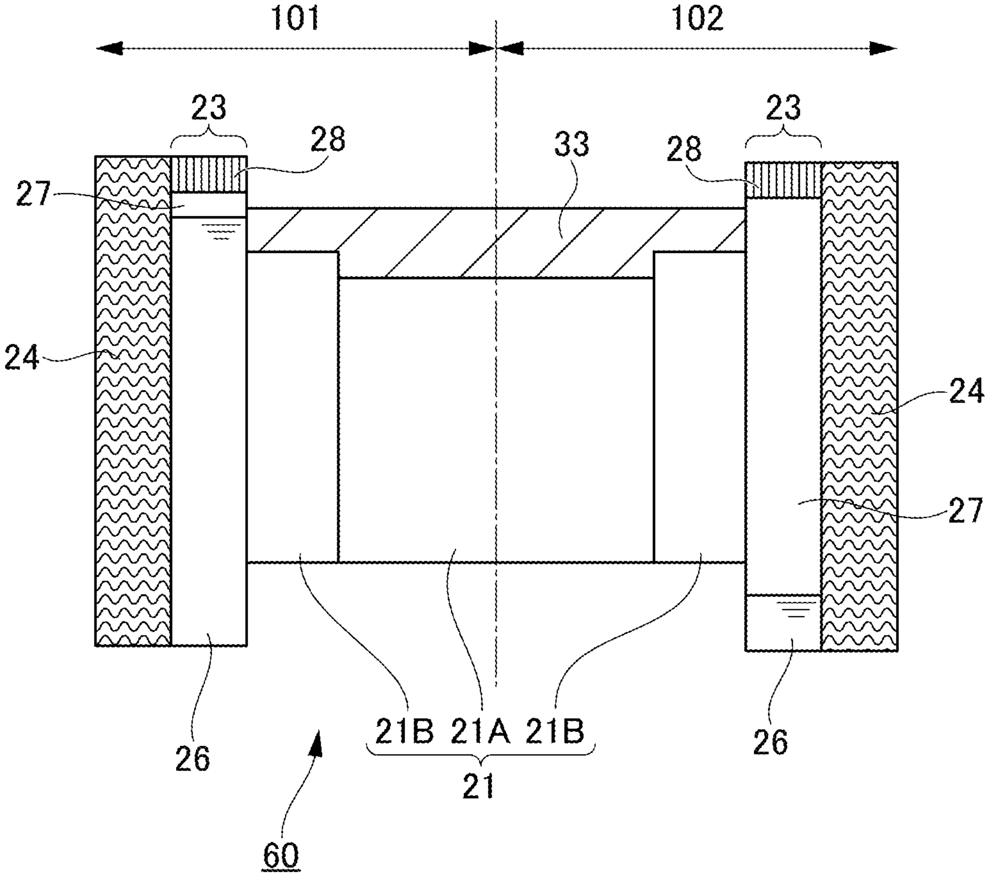
FIG. 8 is a vertical cross-sectional view illustrating a core of a fast reactor of Example 6.

FIG. 8 is a vertical cross-sectional view illustrating a core 60 (inclusive of the gas expansion modules and the neutron absorbers) or Example 6.

The aforementioned core 10 of Example 1 had a core fuel region 21 of a uniform height.

In contrast, the core 60 of this example has the core fuel region 21 is divided into an inner core fuel region 21A and an outer core fuel region 21B having different heights, wherein a sodium plenum 33 is arranged over the core fuel region 21.

In FIG. 8, the constituents similar to those of the core 10 in Example 1 are given the same reference signs.

As illustrated in FIG. 8, the core 60 of this example has the core fuel region 21 which is divided into the inner core fuel region 21A and the outer core fuel region 21B, with the level of height of the top end of the outer core fuel region 21B set higher than that of the inner core fuel region 21A.

The aforementioned core 10 of Example 1, having been illustrated in FIG. 2, had the core fuel region 21 of a uniform height, thus making the output of the core fuel region 21 smaller in the outer side than in the inner side.

In contrast, the core 60 of this example has the outer core fuel region 21B with the top end set higher than that of the inner core fuel region 21A, while aligning the bottom ends at the same level, so that the outer core fuel region 21B overall will have a larger height, thus enhancing the output of the outer core fuel region 21B. This makes it possible to reduce difference between the outputs of the outer core fuel region 21B and the inner core fuel region 21A, or to equalize the outputs of the outer core fuel region 21B and the inner core fuel region 21A.

The sodium plenum 33 may be structured so as to be partitioned by a wrapper tube at above the fuel assemblies where no fuel rod bundle is contained, and made available for housing sodium, as described in Patent Literature 1.

The core 60 of this example has the neutron absorbers 24 arranged on the outer side, in the radial direction, of the gas expansion modules 23, just like in the core 10 of Example 1, so that obtainable is an effect similar to that in the core 10 of Example 1.

With the top end of the outer core fuel region 21B set higher than the top end of the inner core fuel region 21A, the outer core fuel region 21B overall will have a larger height, whereby the core 60 of this example can enhance the output from the outer core fuel region 21B.

The core 60 of this example can also reduce the void reactivity of sodium, as a result of provision of the sodium plenum 33 over the core fuel region 21 (21A, 21B).

Note that the present invention is not limited to the aforementioned embodiments and examples, but can include various modifications. For example, the aforementioned embodiments and examples have been detailed merely for easy understanding of the present invention, without being limited to those having all of the described structures.

What is claimed is:

1. A core of a fast nuclear reactor having arranged therein at least one gas expansion module each of which being a hollow tubular structure with one end closed and an other end opened, the core comprising:

at least one neutron absorber that absorbs neutrons, adjoins an outer face, in a radial direction of the core, of each of the at least one gas expansion module, and at least one neutron moderator that slows down neutrons, adjoins an outer face, in a radial direction of the core, of each of the at least one gas expansion module, wherein the at least one neutron absorber is further arranged so as to adjoin the at least one neutron moderator.

2. The core of a fast nuclear reactor according to claim 1, wherein the at least one gas expansion module comprises a single series of gas expansion modules arranged along the outer face in the radial direction of a core fuel region.

3. The core of a fast nuclear reactor according to claim 1, further comprising a radial-direction blanket region arranged between a core fuel region and a reflector region, wherein the at least one gas expansion module is arranged between the core fuel region and the radial-direction blanket region.

4. The core of a fast nuclear reactor according to claim 1, further comprising a sodium plenum arranged over a core fuel region.

5. The core of a fast nuclear reactor according to claim 4, wherein the core fuel region has an inner core fuel region and an outer core fuel region, with a level of height of a top end of the outer core fuel region set higher than a level of height of a top end of the inner core fuel region.

6. The core of a fast nuclear reactor according to claim 1, wherein the core allows for a top end of the at least one neutron absorber to be kept at a level higher than a liquid level in the at least one gas expansion module during a rated operation of a main circulation pump, and a bottom end of the at least one neutron absorber to be kept at a level lower than the liquid level in the at least one gas expansion module during a shutdown of the main circulation pump.

7. The core of a fast nuclear reactor according to claim 6, wherein the top end of the at least one neutron absorber is higher than a top end of a gas space in the at least one gas expansion module.

8. The core of a fast nuclear reactor according to claim 1, wherein each of the at least one gas expansion module has, arranged above a gas space thereof, a topmost neutron absorber that absorbs neutrons.

* * * * *